US012638993B2

(12) United States Patent
Kitagawa

(10) Patent No.: US 12,638,993 B2
(45) Date of Patent: May 26, 2026

(54) DISTRIBUTED MEMORY DATA PATH FOR CIRCUIT UNDER ARRAY

(71) Applicant: Micron Technology, Inc., Boise, ID (US)

(72) Inventor: Makoto Kitagawa, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 69 days.

(21) Appl. No.: 18/524,739

(22) Filed: Nov. 30, 2023

(65) Prior Publication Data

US 2024/0211152 A1 Jun. 27, 2024

Related U.S. Application Data

(60) Provisional application No. 63/434,599, filed on Dec. 22, 2022.

(51) Int. Cl.
*G06F 3/06* (2006.01)
(52) U.S. Cl.
CPC .......... *G06F 3/0635* (2013.01); *G06F 3/0604* (2013.01); *G06F 3/0679* (2013.01)

(58) Field of Classification Search
CPC .. G06F 15/76; G06F 15/8038; G06F 13/4284; G06F 13/38; G06F 13/1673; G06F 13/4022; G06F 3/0635; G06F 3/0604; G06F 3/0679
See application file for complete search history.

(56) References Cited

U.S. PATENT DOCUMENTS

| | | | |
|---|---|---|---|
| 9,922,716 B2 | 3/2018 | Hisung et al. | |
| 2019/0155666 A1* | 5/2019 | Dobbs | ..................... G06F 15/76 |

* cited by examiner

*Primary Examiner* — Ernest Unelus
(74) *Attorney, Agent, or Firm* — Fletcher Yoder, P.C.

(57) ABSTRACT

A memory device may include various circuitry including multiple memory banks and a circuit under array. The circuit under array may include a number of control blocks each coupling to a respective memory bank. The control blocks may route data and commands to the memory cells of the memory arrays of the respective memory banks. In particular, the control blocks may include routing circuitry including column routing circuits, row routing circuits, and coupling routing circuits to route data between external devices and the memory banks. For example, the coupling routing circuits may couple the column routing circuits and the row routing circuits. Implementing the coupling routing circuits with the control blocks may reduce a footprint of the circuit under array.

19 Claims, 2 Drawing Sheets

DISTRIBUTED MEMORY DATA PATH FOR CIRCUIT UNDER ARRAY

CROSS-REFERENCE TO RELATED APPLICATIONS

This application claims priority to U.S. Provisional Application No. 63/434,599, filed Dec. 22, 2022, entitled "DISTRIBUTED MEMORY DATA PATH FOR CIRCUIT UNDER ARRAY," which is incorporated by reference herein in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

The following relates generally to a memory architecture having a circuit under array (CuA) coupled to one or more memory banks of a memory device to allow high array efficiency. For example, a memory bank may include a number of memory arrays each including multiple memory cells storing data bits and providing stored data bits upon selection. The circuit under array may include a routing circuit electrically coupling the memory cells of the memory arrays of the memory banks with input/output circuitry of the memory device, among other things. For example, the routing circuit may provide data bits to the memory cells or the input/output circuitry for performing various memory operations such as read and write operations. In different cases, the routing circuit may have different circuitry and/or data path architecture.

BRIEF DESCRIPTION OF THE DRAWINGS

Various aspects of this disclosure may be better understood upon reading the following detailed description and upon reference to the drawings in which.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The current disclosure is directed to systems and methods having improved data routing by data control circuitry of a circuit under array (CuA) in a memory device. For example, a memory device may include multiple memory banks each including a number of memory arrays. The memory device may also include the data control circuitry including circuitry for routing data to various memory arrays of different data banks. In some cases, the data control circuitry may be disposed under and/or coupled to the memory banks, for example, as part of a circuit under array. Moreover, the data control circuitry and/or the circuit under array may be made of any viable composition of materials such as various forms of a complementary metal oxide semiconductor (CMOS) material.

The memory banks of the memory device may be disposed in multiple rows and multiple columns. Moreover, each memory bank may include multiple memory arrays including storage cells (or memory cells). The data control circuitry may include transceivers and data lines to route data (e.g., instructions, storage data, retrieved data, etc.) between the memory arrays of each memory bank and an input/output interface of the memory device. Systems and methods are described herein for efficient implementation of the transceivers and the data lines to reduce a size of the data control circuitry and/or a footprint of the memory device.

Figure 1:
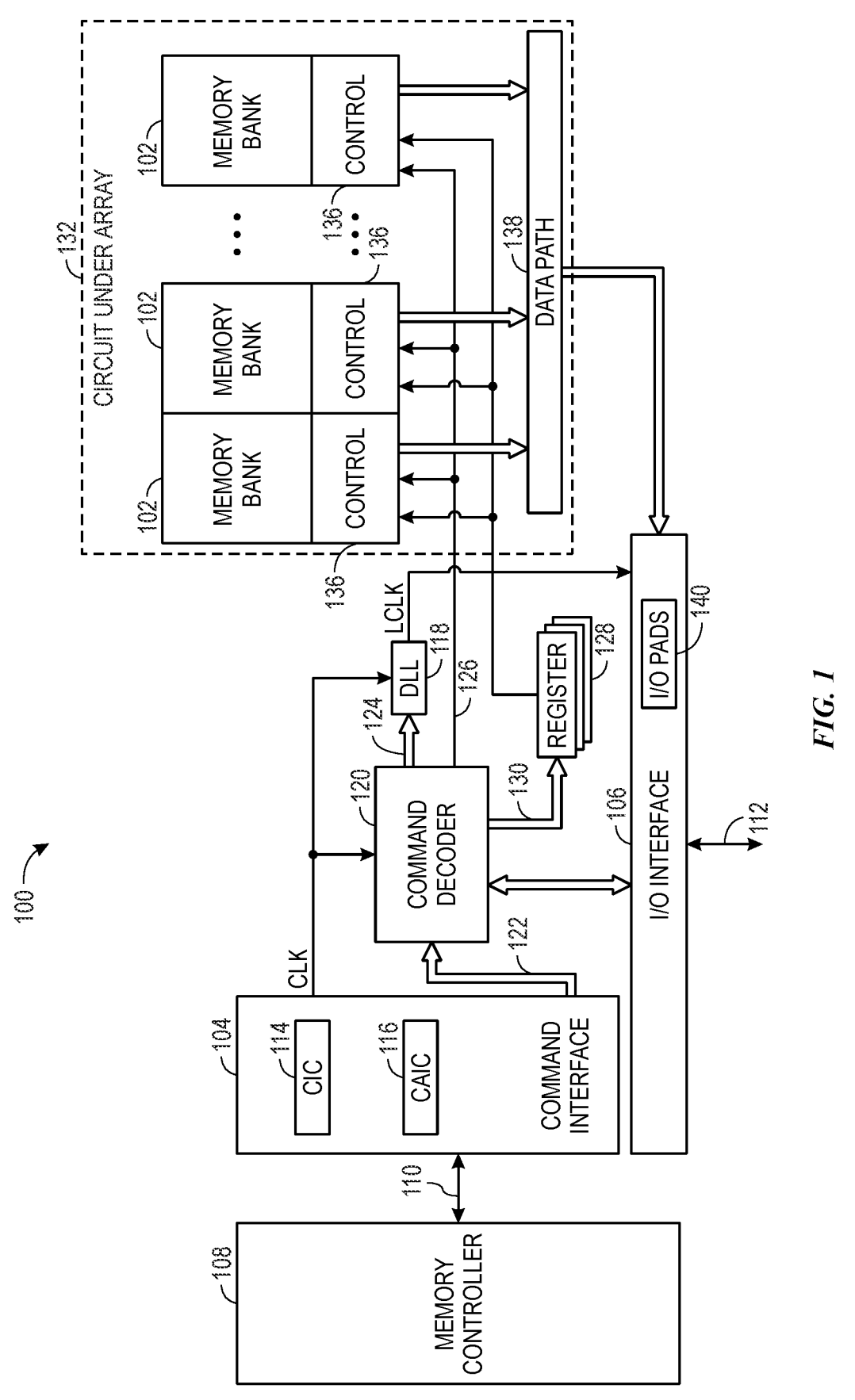
FIG. 1 is a block diagram illustrating certain features of a memory device, in accordance with an embodiment of the present disclosure.

Turning now to the figures, FIG. 1 depicts a simplified block diagram illustrating certain features of a memory device 100 (e.g., a memory subsystem of an apparatus). Specifically, the block diagram of FIG. 1 depicts a functional block diagram illustrating certain functionality of the memory device 100. In accordance with one embodiment, the memory device 100 may include a random access memory (RAM) device, a ferroelectric RAM (FeRAM) device, a dynamic RAM (DRAM) device, a static RAM (SRAM) device (including a double data rate SRAM device), flash memory, and/or a 3D memory array including phase change (PC) memory and/or other chalcogenide-based memory, such as self-selecting memories (SSM). Moreover, each memory cell of such memory devices may include a corresponding logic storing device (e.g., a capacitor, a resistor, or the resistance of the chalcogenide material (s)).

The memory device 100 may include a number of memory banks 102 each inclusive of one or more memory arrays. For example, the memory banks 102 may be disposed in multiple columns and rows. Various configurations, organizations, and sizes of the memory banks 102 on the memory device 100 may be used based on an application and/or design of the memory device 100 within an electrical system. In different embodiments, the memory banks 102 may include a different number of rows and/or columns of memory cells. Moreover, the memory banks 102 may each include a number of pins for communicating with other blocks of the memory device 100. As such, a number of transceivers and data lines (e.g., one or more data buses) may be coupled to each memory bank. For example, each memory bank 102 may receive one data bit per pin at each clock cycle from a data line and/or transceiver. In some cases, the memory banks 102 may be grouped into multiple memory groups (e.g., two memory groups, three memory groups).

The memory device 100 may also include a command interface 104 and an input/output (I/O) interface 106 (I/O circuit). The command interface 104 is configured to provide a number of signals received from a processor (e.g., a processor subsystem of an apparatus) or a controller, such as a memory controller 108. In different embodiments, the memory controller 108, hereinafter controller 108, may include one or more processors (e.g., memory processors), one or more programmable logic fabrics, or any other suitable processing components.

In some embodiments, a bus 110 may provide a signal path or a group of signal paths to allow bidirectional communication between the controller 108, the command interface 104, and the I/O interface 106. For example, the controller 108 may receive memory access requests from the I/O interface via the command interface 104 and the bus 110. Moreover, the controller 108 may provide the access commands and/or access instructions for performing memory operations to the command interface 104 via the bus 110.

Similarly, an external bus 112 may provide another signal path or group of signal paths to allow for bidirectional transmission of signals, such as data signals and access commands (e.g., read/write requests), between the I/O interface 106, the controller 108, a command decoder 120, and/or other components. Thus, the controller 108 may provide various signals (e.g., the access commands, the access instructions, or other signals) to different components of the memory device 100 to facilitate the transmission and receipt of data to be written to or read from the memory banks 102.

That said, the command interface 104 may receive different signals from the controller 108. For example, a reset command may be used to reset the command interface 104, status registers, state machines and the like, during power-up. Various testing signals may also be provided to the memory device 100. For example, the controller 108 may use such testing signals to test connectivity of different components of the memory device 100. In some embodiments, the command interface 104 may also provide an alert signal to the controller 108 upon detection of an error in the memory device 100. Moreover, the I/O interface 106 may additionally or alternatively be used for providing such alert signals, for example, to other system components electrically connected to the memory device 100.

The command interface 104 may also receive one or more clock signals from an external device (e.g., an external clock signal). Moreover, the command interface 104 may include a clock input circuit 114 (CIC) and a command address input circuit 116 (CAIC). The command interface 104 may use the clock input circuit 114 and the command address input circuit 116 to receive the input signals, including the access commands, to facilitate communication with the memory banks 102 and other components of the memory device 100.

Moreover, the clock input circuit 114 may receive the one or more clock signals (e.g., the external clock signal) and may generate an internal clock signal (CLK) therefrom. In some embodiments, the command interface 104 may provide the CLK to the command decoder 120 and an internal clock generator, such as a delay locked loop (DLL) 118 circuit. The DLL 118 may generate a phase controlled internal clock signal (LCLK) based on the received CLK. For example, the DLL 118 may provide the LCLK to the I/O interface 106. Subsequently, the I/O interface 106 may use the received LCLK as a clock signal for transmitting the read data using the external bus 112.

The command interface 104 may also provide the internal clock signal CLK to various other memory components. As mentioned above, the command decoder 120 may receive the internal clock signal CLK. In some cases, the command decoder 120 may also receive the access commands via a bus 122 and/or through the I/O interface 106 received via the external bus 112. For example, the command decoder 120 may receive the access commands through the I/O interface 106 transmitted by one or more external devices. In some cases, a processor may transmit the access commands.

The command decoder 120 may decode the access commands and/or the memory access requests to provide corresponding access instructions for accessing target memory cells. For instance, the command decoder 120 may provide the access instructions to one or more control blocks 136 associated with the memory banks 102 via a bus 126. In some cases, the command decoder 120 may provide the access instructions to the control blocks 136 in coordination with the DLL 118 over a bus 124. For example, the command decoder 120 may coordinate generation of the access instructions in-line (e.g., synchronized) with the CLK and/or LCLK.

Accordingly, the command decoder 120 may decode the access commands (e.g., memory access requests) to provide the access instructions. In some cases, the command decoder 120 may receive the access commands using a rising edge and/or a falling edge of the external clock signal. For example, a processor may transmit the access commands using a memory command protocol such as the multi-clock cycle memory command protocol. Moreover, the processor may use a specific memory command protocol based at least in part on the number of pins of the memory device 100 or the I/O interface 106, the number of memory banks 102, the number of rows and/or columns of the memory banks 102, and/or a bandwidth of the memory device 100 for communication with one or more of the memory banks 102. Subsequently, the command decoder 120 may provide the access instructions to the memory banks 102 based on receiving and decoding the access commands. Accordingly, the command decoder 120 may provide the access instructions to the memory banks 102 using one or multiple clock cycles of the CLK via the bus 126. The command decoder 120 may also transmit various signals to one or more registers 128 via, for example, one or more wiring lines 130.

In some embodiments, the memory device 100 may include control blocks 136. In such embodiments, each memory bank 102 may be associated with or include a respective control block 136. In some cases, each of the control blocks 136 may also provide row decoding and column decoding capability based on receiving the access instructions. Accordingly, the control block 136 may facilitate accessing the memory arrays of the respective memory banks 102. For example, the control blocks 136 may include circuitry (e.g., row decoders, column decoders, transceivers, and/or data lines, among other things) to facilitate accessing the memory cells of one or more memory arrays of the respective memory banks 102 based on receiving the access instructions. Moreover, the control blocks 136 may be coupled via data buses, as will be appreciated.

In some cases, the control blocks 136 may receive the access instructions and determine target memory banks 102 associated with the target memory cells. In specific cases, the command decoder 120 may include the control blocks 136. Moreover, the control blocks 136 may also provide timing control and data control functions to facilitate execution of different commands with respect to the respective memory banks 102.

Furthermore, the command decoder 120 may provide register commands to the one or more registers 128 to facilitate operations of one or more of the memory banks 102, the control blocks 136, and the like. For example, one of the one or more registers 128 may provide instructions to configure various modes of programmable operations and/or configurations of the memory device 100. The one or more registers 128 may be included in various semiconductor devices to provide and/or define operations of various components of the memory device 100.

In some embodiments, the one or more registers 128 may provide configuration information to define operations of the memory device 100. For example, the one or more registers 128 may include operation instructions for DRAMs, synchronous DRAMs, FeRAMs, chalcogenide memories (e.g., SSM memory, PC memory), or other types of memories. As discussed above, the one or more registers 128 may receive various signals from the command decoder 120, or other components, via the one or more wiring lines 130. The additional registers may involve additional wiring across the semiconductor device (e.g., die), such that the registers are communicatively coupled to the corresponding memory components.

The I/O interface 106 may include a number of pins (e.g., 7 pins, 10 pins, 25 pins, etc.) to facilitate data communication with external components (e.g., the processing component, such as a processor). Moreover, the I/O interface 106 may include a number of I/O pads 140 to facilitate data communication according to one or more communication standards. In some cases, each I/O pad 140 may convert a data type (e.g., frequency, data rate, etc.) between the memory device 100 and one or more external devices. For example, the I/O pads 140 may include a Low-Power Double Data Rate (LPDDR), among other possibilities.

In any cases, the I/O interface 106 may receive the access commands via the pins. Moreover, data stored on the memory cells of the memory banks 102 may be transmitted to and/or retrieved from the memory banks 102 via the control blocks 136 over the data path 138. The data path 138 may include a plurality of bi-directional data buses to one or more external devices via the I/O interface 106. For example, the control blocks 136 may be electrically coupled via row buses and column buses of the data path 138. In some embodiments, the data path 138 (or the bus 126) may include a common data path, a common address path, a common write command path, and a common read command path. The data path 138 may traverse across the memory device 100.

In some embodiments, the memory device 100 includes a circuit under array (CuA) architecture. The circuit under array 132 may include the data path 138 for communication through and/or between the control blocks 136. For example, the control blocks 136 may include routing circuitry including transceivers for directional communication of data over the row buses and the column buses of the data path 138. Accordingly, the circuit under array 132 may facilitate bi-directional communication of data over the data path 138.

For certain memory devices, such as a DDR5 SDRAM memory device, the I/O signals may be divided into upper and lower bytes; however, such segmentation is not utilized in conjunction with other memory device types. That said, in different embodiments, the memory device 100 may include additional or alternative components. That is, the memory device 100 may include additional or alternative components such as power supply circuits (for receiving external VDD and VSS signals), read/write amplifiers (to amplify signals during read/write operations), temperature sensors (for sensing temperatures of the memory device 100), etc. Accordingly, it should be understood that the block diagram of FIG. 1 is only provided to highlight certain functional features of the memory device 100 to aid in the subsequent detailed description.

Figure 2:
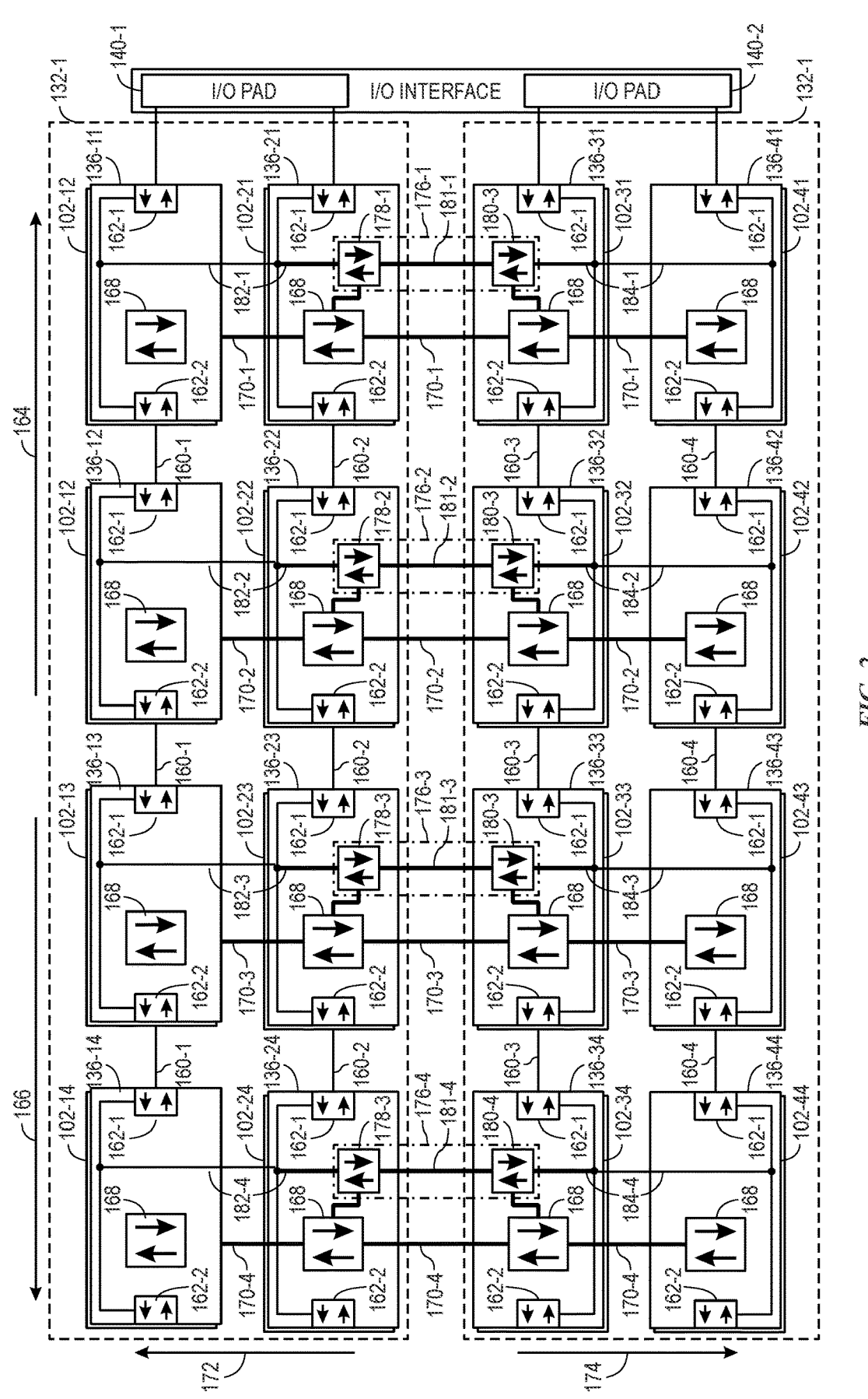
FIG. 2 is a block diagram illustrating at least a portion of memory banks, control blocks, and input/output interface of the memory device of FIG. 1, in accordance with an embodiment of the present disclosure.

FIG. 2 depicts a block diagram of the circuit under array 132 coupled to the I/O interface 106 of the memory device 100. The circuit under array 132 may include a number of control blocks 136 (e.g., 136-11, 136-12, 136-13, 136-14, 136-21, 136-22, 136-23, 136-24, 136-31, 136-32, 136-33, 136-34, 136-41, 136-42, 136-43, and 136-44) arranged in multiple rows and columns. It should be appreciated that although a specific number of rows and columns is shown, in alternative or additional embodiments, the circuit under array 132 may include a different number of rows and columns of the control blocks 136. Moreover, in some cases, each row and/or column may include a different number of control blocks 136. For example, the depicted circuitry may illustrate a portion of the circuit under array 132.

As mentioned above, in some embodiments, each control block 136 may be associated with a respective memory bank 102 (e.g., 102-11, 102-12, 102-13, 102-14, 102-21, 102-22, 102-23, 102-24, 102-31, 102-32, 102-33, 102-34, 102-41, 102-42, 102-43, and 102-44). In specific embodiments, each control block 136 may be disposed proportionally to (e.g., nearly overlaid on/under, disposed near, integrated with, among other possibilities) a respective memory bank 102. For simplicity and visibility, each control block 136 is depicted overlaid on/under a respective memory bank 102. However, in alternative or additional embodiments, the control blocks 136 and the respective memory banks 102 may be arranged in any viable disposition.

In the depicted embodiment, the I/O interface 106 may include a first I/O pad 140-1 and a second I/O pad 140-2. The first I/O pad 140-1 and the second I/O pad 140-2 may each include a number of pins and/or data lines for data communication. For example, in different embodiments, the first I/O pad 140-1 and the second I/O pad 140-2 may each include 32 pins and/or data lines, 64 pins and/or data lines, 256 pins and/or data lines, 512 pins and/or data lines, 1024 pins and/or data lines, and so on. The number of pins and/or data lines of the first I/O pad 140-1 and the second I/O pad 140-2 may correspond to a bandwidth of the memory device 100 for data communication external to the memory device 100.

As such, the circuit under array 132 may include routing circuitry to distribute data communication (e.g., data transmission, data reception) over the first I/O pad 140-1 and the second I/O pad 140-2, as discussed herein. In some cases, distribution of the data communication over the first I/O pad 140-1 and the second I/O pad 140-2 may improve a communication bandwidth and/or communication speed of the circuit under array 132. Moreover, such routing circuitry may reduce a footprint of the circuit under array 132.

The circuit under array 132 may include a first portion 132-1 associated with the first I/O pin 140-1 and a second portion 132-2 associated with the second I/O pin 140-2. The first portion of the circuit under array 132-1 may include a first row of control blocks 136-11, 136-12, 136-13, and 136-14 and a second row of control blocks 136-21, 136-22, 136-23, and 136-24. The control blocks 136 of the first row and the second row (e.g., the first portion of the circuit under array 132-1) are coupled to the first I/O pad 140-1 via a first row bus 160-1 and a second row bus 160-2 respectively. Moreover, each control block 136 of the first row and the second row may each include a row routing circuit 162 including a number of transceivers to provide data to and receive data from the first row bus 160-1 and the second row bus 160-2 respectively.

Similarly, the second portion of the circuit under array 132-2 may include a third row of control blocks 136-31, 136-32, 136-33, and 136-34 and a fourth row of control blocks 136-41, 136-42, 136-43, and 136-44. The control blocks 136 of the third row and the fourth row (e.g., the second portion of the circuit under array 132-2) are coupled to the second I/O pad 140-2 via a third row bus 160-3 and a fourth row bus 160-4 respectively. Each control block 136 of the third row and the fourth row may include the row routing circuit 162 including a number of transceivers to provide data to and receive data from the third row bus 160-3 and the fourth row bus 160-4 respectively.

In some embodiments, each row routing circuit 162 of the control blocks 136 may include a first row routing circuit 162-1 to transmit data or receive data via the respective row bus 160 in a first row direction 164 toward the I/O interface 106. At least some of the row routing circuits 162 of the control blocks 136 may include a second row routing circuit 162-2 to transmit or receive data via the respective row bus 160 in a second row direction 166 away from the I/O interface 106. In some cases, the first row routing circuit 162-1 and the second row routing circuit 162-2 may be implemented on different sides of a control block 136. In such cases, the first row routing circuit 162-1 and the second row routing circuit 162-2 may be internally coupled within the respective control block 136. Accordingly, the transceivers of the first row routing circuit 162-1 and the second row routing circuit 162-2 may transmit or receive data in the first row direction 164 and the second row direction 166 to distribute and/or route data.

The control blocks 136 are also arranged in multiple columns. The circuit under array 132 may include a first column of control blocks 136-11, 136-21, 136-31, and 136-41, a second column of control blocks 136-12, 136-22, 136-32, and 136-42, a third column of control blocks 136-13, 136-23, 136-33, and 136-43, and a fourth column of control blocks 136-14, 136-24, 136-34, and 136-44. The control blocks 136 may each include a bank routing circuit 168 (or column routing circuit 168) coupled to the respective memory banks 102. Each bank routing circuit 168 may provide data to and/or receive data from (e.g., access commands, access instructions, storage data, stored data, among other things) a respective memory bank 102. Moreover, the bank routing circuits 168 in each column of the control blocks 136 are coupled via a respective column bus 170 (e.g., 170-1, 170-2, 170-3, and 170-4).

Accordingly, the circuit under array 132 may transmit data to and/or receive data from the memory banks 102 in each column of control blocks 136 via the respective column bus 170. For example, each bank routing circuit 168 may include a number of transceivers (e.g., column transceivers) among other things to transmit and receive data via the column bus 170. The transceivers of the bank routing circuits 168 may transmit or receive data in a first column direction 172 or a second column direction 174 to distribute and/or route data.

With the foregoing in mind, in the depicted embodiment, the control blocks 136 of each column disposed in the second row and the third row (e.g., the middle rows) may share coupling routing circuitry 176. Each coupling routing circuitry 176 (e.g., 176-1, 176-2, 176-3, 176-4) may include a first respective coupling routing circuit 178 (e.g., 178-1, 178-2, 178-3, 178-4) disposed on the respective control block 136 of the second row and a second respective coupling routing circuit 180 (e.g., 180-1, 180-2, 180-3, 180-4) disposed on the respective control block 136 of the third row. In alternative or additional embodiments, the control blocks 136 of each column disposed in adjacent rows that are coupled to different I/O pads may share the coupling routing circuitry 176. In any case, the first coupling routing circuit 178 may be disposed on a control block 136 coupled to a first I/O pad (e.g., the first I/O pad 140-1) and the second coupling routing circuit 180 may be disposed on an adjacent control block 136 on the same column coupled to a second I/O pad (e.g., the second I/O pad 140-2).

For example, each of the first coupling routing circuits 178 is coupled to the corresponding second coupling routing circuit 180 by a respective coupling bus 181. Moreover, each first coupling routing circuit 178 is coupled to the row routing circuits 162 of other control blocks 136 disposed on the same column and coupled to the first I/O pad 140-1. Each of the first coupling routing circuits 178 is coupled to such row routing circuits 162 by a first row coupling bus 182. Similarly, each of the second coupling routing circuits 180 is coupled to the corresponding first coupling routing circuit 178 by the respective coupling bus 181.

Moreover, each second coupling routing circuit 180 is coupled to the row routing circuits 162 of other control blocks 136 disposed on the same column and coupled to the second I/O pad 140-2. Each of the second coupling routing circuits 180 is coupled to such row routing circuits 162 by a second row coupling bus 184. Accordingly, in some embodiments, the first row coupling bus 182 and the second row coupling bus 184 may each include a fraction (e.g., half) of the number of data lines as the coupling bus 181 based on communication (e.g., data distribution) between the first row coupling bus 182 and the second row coupling bus 184.

The first coupling routing circuit 178 and the second coupling routing circuit 180 may each include a number of transceivers. The transceivers of each first coupling routing circuit 178 may provide data to the second coupling routing circuit 180 or the row routing circuits 162 of the control blocks 136 of the same column coupled to the first I/O pad 140-1. Moreover, the second coupling routing circuit 180 may provide data to the first coupling routing circuit 178 or the row routing circuits 162 of the control blocks 136 coupled to the second I/O pad 140-2. Each of the first coupling routing circuits 178 and the second coupling routing circuits 180 may be coupled to a bank routing circuit 168 associated with the respective control block 136 to receive data from or provide data to the respective control block 136 and/or other control blocks 136 in the same column.

As mentioned above, the control blocks 136 of each column are coupled to each other via the respective column buses 170 and the control blocks 136 of each row are coupled to the I/O pads 140 via the respective row buses 160. Moreover, each coupling routing circuitry 176 of each column may provide a data communication path between a respective column bus 170 and the row buses 160-1, 160-2, 160-3, and 160-4. For example, each coupling routing circuitry 176 may distribute the communication data between the first portion of the circuit under array 132-1 coupled to the I/O pad 140-1 and the second portion of the circuit under array 132-2 coupled to the 140-2. That is, each memory bank 102 may transmit data to external devices and/or receive data from the external devices via both of the I/O pads 140-1 and 140-2 based on the operations of the bank routing circuits 168, the row routing circuits 162, and the coupling routing circuits 178 and 180. Accordingly, in some embodiments, each memory bank 102 may transmit data to external devices and/or receive data from the external devices via both of the I/O pads 140-1 and 140-2 to improve a rate, frequency, and/or bandwidth for communicating data.

By the way of example, the I/O pads 140-1 and 140-2 may receive data (e.g., 256 data bits) for storage on the memory cells of one or more memory arrays of the memory bank 102-43. For example, the first I/O pad 140-1 may receive a first portion of the data (e.g., 128 data bits) and the second I/O pad 140-2 may receive a remaining portion of the data (e.g., 128 data bits). The row buses 160-1 and 160-2 may each provide a sub-portion of the portion of the data to the first coupling routing circuit 178-3. The first coupling routing circuit 178-3 may receive the sub-portion of the first portion of the data from the row buses 160-1 and 160-2 via the first coupling bus 182-3. In the depicted embodiment, the first coupling bus 182-3 is coupled to the row routing circuit 162. However, in alternative or additional embodiments, the first coupling bus 182-3 may be coupled to the row buses 160-1 and 160-2. In any case, the first coupling routing circuit 178-3 may provide the first portion of the data to the second coupling routing circuit 180-3.

Moreover, as mentioned above, the second I/O pad 140-2 may receive the remaining portion of the data (e.g., 128 data bits). The row buses 160-3 and 160-4 may each provide a sub-portion of the remaining portion of the data to the second coupling routing circuit 180-3. The second coupling routing circuit 180-3 may receive the sub-portion of the remaining portion of the data from the row buses 160-3 and 160-4 via the second coupling bus 184-3. Similar to the first coupling bus 182-3, although the second coupling bus 184-3 is coupled to the row routing circuit 162, in alternative or additional embodiments, the second coupling bus 184-3 may be coupled to the row buses 160-3 and 160-4.

In any case, the second coupling routing circuit 180-3 may provide the received data (e.g., 256 data bits) to the bank routing circuit 168 of the control block 136-33. Accordingly, the bank routing circuitry 168 of the control block 136-43 may receive the data (e.g., 256 data bits) for storage via the column bus 170-3. In alternative embodiments, the first coupling routing circuit 178-3 may provide the first portion of data (e.g., 256 data bits) to the bank routing circuit 168 of the control block 136-23. In such embodiments, the bank routing circuitry 168 of the control block 136-43 may receive the first portion of data (e.g., 256 data bits) for storage via the column bus 170-3 from the bank routing circuit 168 of the control block 136-23.

Implementing the routing path of the circuit under array 132 based on the circuitry of FIG. 2 may reduce a footprint of the circuit under array 132 and thus increase array efficiency. For example, only the control blocks 136 of the middle rows may include the coupling routing circuitry 176. Moreover, the first coupling routing circuits 178 and the second coupling routing circuits 180 may each include a fraction (e.g., half, $\frac{1}{4}^{th}$, $\frac{1}{8}^{th}$, $\frac{1}{16}^{th}$, and so on) of transceivers compared to that of the bank routing circuits 168. Moreover, the first row routing circuit 162-1 and the second row routing circuit 162-2 may each include a fraction (e.g., half, $\frac{1}{4}^{th}$, $\frac{1}{8}^{th}$, $\frac{1}{16}^{th}$, and so on) of transceivers compared to that of the bank routing circuits 168. Similarly, the first row coupling bus 182, the second row coupling bus 184, and the row buses 160 may include a fraction (e.g., half, $\frac{1}{4}^{th}$, $\frac{1}{8}^{th}$, $\frac{1}{16}^{th}$, and so on) of data lines compared to the number of data lines of the column buses 170 and/or the coupling buses 182 and 184. For example, the number of data lines of the column buses 170, the coupling buses 182 and 184, and/or the transceivers of each control block 136 may correspond to a bandwidth of each data bank (e.g., 128, 256, 512, 1024, and so on) for data communication.

In some embodiments, the access instructions, the access commands, the storage data, the retrieved data, among other things, may include data indicative of a routing path through the control blocks 136. In alternative or additional, the memory controller 108 may provide control signals to adjust the routing path of the control blocks 136 to distribute the data communication over the control blocks 136. In yet alternative or additional embodiments, the bank routing circuits 168, the row routing circuits 162, and/or the coupling routing circuits 178 and 180 may each include programmable logic circuit or hard logic to distribute the data communication over the control blocks 136.

Moreover, in some cases, the circuit under array 132 may receive control signals from the memory controller 108 and/or a controller on the host-side of a memory-host interface. For example, a processor, microcontroller, field programmable gate array (FPGA), application-specific integrated circuit (ASIC), or the like may each include a memory controller to provide the control signals. Furthermore, a communication network may enable data communication there between and, thus, a client device to utilize hardware resources accessible through the described circuitry.

Based at least in part on user input to the client device, processing circuitry associated with the memory device may perform one or more operations to transmit one or more memory access requests for accessing memory cells arranged in the memory arrays of the memory banks. Moreover, the controller may provide the commands using a number of clock cycles based on the number of rows and columns of the memory banks and/or memory arrays of the memory banks. The controller may provide the commands using a number of clock cycles based on a number of communication pins of the memory banks to facilitate efficient response to the one or more memory access requests.

Data communicated between the client device and the memory devices may be used for a variety of purposes including, but not limited to, presentation of a visualization to a user through a graphical user interface (GUI) at the client device, processing operations, calculations, or the like. Thus, with this in mind, the above-described improvements to memory, controller operations, and memory operations may manifest as improvements in visualization quality (e.g., speed of rendering, quality of rendering), improvements in processing operations, improvements in calculations, or the like based on a reduced footprint, improved communication rate and/or frequency, among other benefits.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A memory device, comprising:
   a plurality of memory banks arranged in a plurality of columns and a plurality of rows, wherein each memory bank of the plurality of memory banks comprises a plurality of memory arrays; and
   a circuit under array comprising:
   a plurality of bank routing circuits, configured to transfer data bidirectionally, arranged in the plurality of columns and the plurality of rows, wherein each bank routing circuit of the plurality of bank routing circuits of a first particular row is directly connected to a first respective memory bank in a previous row and directly connected to a second respective memory bank in a second particular row of the plurality of memory banks;
   a plurality of row routing circuits configured to transfer data bidirectionally;
   a plurality of first coupling routing circuits configured to transfer data bidirectionally, wherein each first coupling routing circuit of the plurality of first coupling routing circuits is directly connected to:
   a first respective bank routing circuit of the plurality of bank routing circuits arranged in a first row of the plurality of rows and a respective column of the plurality of columns; and
   a first subplurality of row routing circuits of the plurality of row routing circuits arranged in the respective column of the first respective bank routing circuit, wherein the first subplurality of row routing circuits are connected to a first input/output (I/O) pad; and
   a plurality of second coupling routing circuits configured to transfer data bidirectionally, wherein each second coupling routing circuit of the plurality of second coupling routing circuits is directly connected to:
   a second respective bank routing circuit of the plurality of bank routing circuits arranged in a second row of the plurality of rows and the respective column of the plurality of columns;
   a remaining subplurality of row routing circuits of the plurality of row routing circuits arranged in the respective column of the second respective bank routing circuit, wherein the remaining subplurality of row routing circuits are connected to a second I/O pad; and
   a respective first coupling routing circuit of the plurality of first coupling routing circuits arranged in the first row and the respective column of the second respective bank routing circuit, wherein each of the plurality of first coupling routing circuits and each of the plurality of second coupling routing circuits that is disposed on a same column of the plurality of columns are directly connected to each other via a plurality of bidirectional coupling buses.

2. The memory device of claim 1, wherein each row routing circuit of the plurality of row routing circuits comprises a particular number of transceivers, wherein the particular number equals to half of a number of transceivers of each of the plurality of first coupling routing circuits or the plurality of second coupling routing circuits, or a quarter of a number of transceivers of each bank routing circuit of the plurality of bank routing circuits.

3. The memory device of claim 1, wherein a number of data lines in each coupling bus of the plurality of bidirectional coupling buses is equal to a number of data lines in each column bus of a plurality of column buses.

4. The memory device of claim 1, wherein the first row and an adjacent row to the first row are disposed in two middle rows of the plurality of rows of the bank routing circuits.

5. The memory device of claim 1, wherein the first respective bank routing circuit is disposed on the first row of the plurality of rows and the second respective bank routing circuit is disposed on an adjacent row to the first row.

6. The memory device of claim 1, wherein each first coupling routing circuit of the plurality of first coupling routing circuits is connected to a first respective memory bank of the plurality of memory banks through the first respective bank routing circuit.

7. A data control circuit of a memory device, comprising:
   a first plurality of control blocks connected to a first input/output pad, wherein the first plurality of control blocks are arranged in a plurality of columns and at least a first row and a second row;
   a second plurality of control blocks connected to a second input/output pad, wherein the second plurality of control blocks are arranged in the plurality of columns and at least a third row and a fourth row, wherein each control block of the first plurality of control blocks and the second plurality of control blocks comprises:
   respective row routing circuitry, configured to transfer data bidirectionally, comprising a first number of transceivers connected to one or more adjacent control blocks in a row direction; and
   a respective column routing circuit, configured to transfer data bidirectionally, comprising a second number of transceivers directly connected to one or more adjacent control blocks and a plurality of memory banks of the memory device in a column direction, wherein the first number of transceivers is a fraction of the second number of transceivers, and each memory bank of the plurality of memory banks comprises a plurality of memory arrays;
   wherein each control block of the second row and the third row comprises a respective coupling routing circuit configured to transfer data bidirectionally, wherein the respective coupling routing circuit is directly connected to:
   the respective column routing circuit of the respective control block;
   the row routing circuitry of the respective control block;
   the coupling routing circuit of an adjacent control block of the same column; and
   the row routing circuitry of the control blocks of the same column.

8. The data control circuit of claim 7, wherein the first number of transceivers are configured to connect to one of the second input/output pad and a first adjacent control block in the same row of the second row.

9. The data control circuit of claim 7, wherein one or more control blocks of the second plurality of control blocks comprise a third number of transceivers configured to connect to the respective row routing circuitry and the respective column routing circuit of the one or more control blocks to route data in a direction of the third row and the fourth row.

10. The data control circuit of claim 7, wherein each control block of the first plurality of control blocks and the second plurality of control blocks is configured to connect to a respective memory bank.

11. The data control circuit of claim 7, wherein the second number of transceivers of the column routing circuit are connected to a column routing circuit of the respective control block of the first plurality of control blocks.

12. A memory device circuit under array, comprising:

a plurality of control blocks arranged in a plurality of columns and a plurality of rows, wherein each control block of the plurality of control blocks is configured to be directly connected to a respective memory bank of a memory device and adjacent control blocks in a column direction, wherein each respective memory bank comprises a plurality of memory arrays;

a plurality of column buses, configured to transfer data bidirectionally, directly connected to the plurality of control blocks in each column in a column direction;

a plurality of row buses, configured to transfer data bidirectionally, directly connected to the plurality of control blocks in each row in a row direction, wherein the plurality of row buses are connected to an input/output circuit; and a plurality of coupling routing circuits, configured to transfer data bidirectionally, disposed on respective control blocks of the plurality of control blocks in a first row of the plurality of rows and a second row of the plurality of rows adjacent to the first row, wherein each coupling routing circuit of each respective column of the plurality of columns is configured to be connected directly to each respective memory bank of the memory device associated with each control block of plurality of control blocks, and wherein each coupling routing circuit of each respective column of the plurality of columns disposed on the first row is connected directly to a coupling routing circuit disposed on the respective column and on the second row, wherein the plurality of coupling routing circuits are configured to distribute data between the plurality of column buses and the plurality of row buses.

13. The memory device circuit under array of claim 12, wherein the plurality of control blocks disposed on the first row of the plurality of rows are configured to receive data from and provide data to a subplurality of the plurality of control blocks and the plurality of control blocks disposed on the second row.

14. The memory device circuit under array of claim 13, wherein the subplurality of the plurality of control blocks are connected to a first input/output pad of the memory device.

15. The memory device circuit under array of claim 13, wherein the plurality of control blocks disposed on the second row of the plurality of rows are configured to receive data from and provide data to remaining control blocks of the plurality of control blocks and the plurality of control blocks disposed on the first row.

16. The memory device circuit under array of claim 15, wherein the remaining control blocks are connected to a second input/output pad of the memory device.

17. The memory device circuit under array of claim 12, wherein the first row and the second row are the middle two rows of the plurality of rows of the control blocks.

18. The memory device of claim 6, wherein each first coupling routing circuit of the plurality of first coupling routing circuits is configured to route data between the first respective memory bank and the first I/O pad via the first subplurality of row routing circuits.

19. The memory device of claim 6, wherein each first coupling routing circuit of the plurality of first coupling routing circuits is configured to route data between the first respective memory bank and the second I/O pad via a second coupling routing circuit of the plurality of second coupling routing circuits and the remaining subplurality of row routing circuits.

* * * * *